United States Patent [19]

Iguchi

[11] Patent Number: 5,233,451
[45] Date of Patent: Aug. 3, 1993

[54] LIQUID CRYSTAL DISPLAY DEVICE WITH CHAMFERED SUBSTRATE EDGE

[75] Inventor: Kazuo Iguchi, Suwa, Japan
[73] Assignee: Seiko Epson Corporation, Tokyo, Japan
[21] Appl. No.: 814,021
[22] Filed: Dec. 26, 1991

[30] Foreign Application Priority Data

Dec. 27, 1990 [JP] Japan .................................. 2-407859
Oct. 28, 1991 [JP] Japan .................................. 3-281197

[51] Int. Cl.$^5$ .................. G02F 1/1333; G02F 1/1343; H01R 9/09; H01R 23/70
[52] U.S. Cl. ........................................ 359/88; 359/82; 439/62; 439/637; 439/636
[58] Field of Search ............... 359/62, 80, 82, 83, 359/88; 439/62, 636, 630, 637, 636

[56] References Cited

U.S. PATENT DOCUMENTS

| | | | |
|---|---|---|---|
| 3,401,369 | 9/1968 | Palmateer et al. | 439/62 |
| 3,587,029 | 6/1971 | Knowles | 439/62 X |
| 4,132,984 | 1/1979 | Gross | 359/88 |
| 4,662,702 | 5/1987 | Furuya | 439/630 |
| 4,806,103 | 2/1989 | Kniese et al. | 439/636 |

FOREIGN PATENT DOCUMENTS

| | | |
|---|---|---|
| 0353421 | 2/1990 | European Pat. Off. . |
| 2732487 | 1/1978 | Fed. Rep. of Germany . |
| 3023614 | 1/1982 | Fed. Rep. of Germany . |
| 3134278 | 3/1983 | Fed. Rep. of Germany . |
| 58-153987 | 9/1983 | Japan . |
| 02-73725 | 11/1990 | Japan . |

Primary Examiner—William L. Sikes
Assistant Examiner—Kenneth Parker
Attorney, Agent, or Firm—Blum Kaplan

[57] ABSTRACT

A liquid crystal display device having a chamfer formed along at least one of the ends of a substrate having a terminal electrode disposed thereon for producing a substantially unimpeded flow of an electric current between a connect pin clip and the terminal electrode. The chamfer is a planar chamfer or an R chamfer and has a chamfer angle and chamfer quantity which can be optimized depending on the substrate thickness. After the connect pin is inserted and disposed, molding agents are applied to cover the connect pin clip.

16 Claims, 4 Drawing Sheets

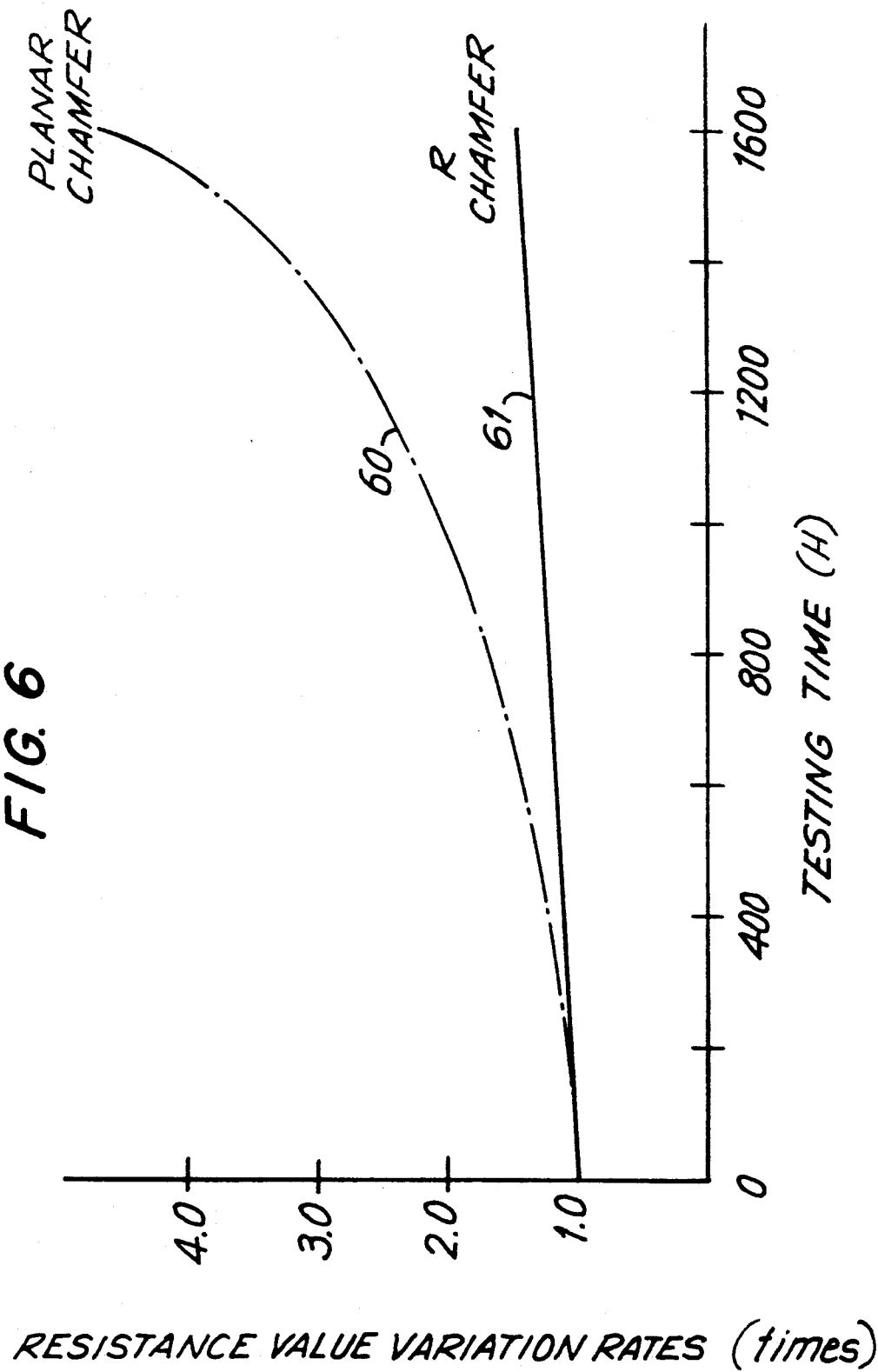

LIQUID CRYSTAL DISPLAY DEVICE WITH CHAMFERED SUBSTRATE EDGE

BACKGROUND OF THE INVENTION

This invention relates generally to a liquid crystal display device and in particular, to a liquid crystal display device wherein at least one ridge line of the glass substrate in the terminal connector region is chamfered.

A conventional liquid crystal display device includes two opposed glass substrates, with one of the substrates having a terminal electrode at the edge thereof. A connect pin clip is provided to be fitted over the substrate and impinging the terminal electrode portion so that the connect pin clip can be electrically connected to an apparatus. Typical apparatuses include vehicles, measuring instruments and electrical appliances for industrial or domestic use.

During manufacturing the end portion of the glass substrate which has been cut often breaks when the connect pin impinges on the terminal electrode. Breakage occurs at the ridge line because the glass cut is often rough.

For this reason, conventional liquid crystal display devices encounter a variety of problems. For example, there is a decline in the conductive reliability of the connection between the connect pin clip and the terminal electrode. When the connect pin clip impinges on the terminal electrode mounted on the glass substrate, the conductive resistance between the terminal electrode and the connect pin clip increases due to erosion of a solder plating agent on the surface of the connect pin clip. The conductive resistance also increases due to the deterioration of the connect pin clip material and a decline of the connect pin clip force which is derived from the impinging impact of the connect pin clip. Consequently, the conduction reliability thereby drastically decreases due to the changes over time.

These defects are caused by the impact vibration during insertion of the connect pin clip and the intrinsic stress upon the material when the connect pin clip is bent to fit.

Accordingly, it is desirable to provide a liquid crystal display device having an improved construction by including a chamfer along a ridge line at the terminal portion of one substrate which overcomes the defects of the prior art.

SUMMARY OF THE INVENTION

Generally speaking, in accordance with the invention, a liquid crystal display device having a chamfer along at least one ridge line of the glass substrate at the terminal portion is provided. The chamfer is formed by planar chamfer processing, thereby producing a planar chamfer along at least one of the ends of the substrate having the terminal electrode disposed thereon. In a preferred embodiment, the chamfer is formed by R chamfer processing, thereby producing an R chamfer along at least one of the ends of the substrate having the terminal electrode disposed thereon. A connect pin clip is inserted over the substrate to contact and impinge upon the terminal electrode.

The chamfer forms a chamfer quantity and a chamfer angle which can be optimized in conjunction with the substrate thickness. As a result, the conductive resistance between the connect pin clip and the terminal electrode is stabilized, thereby significantly reducing disconnections caused by an increase in the conductive resistance.

Accordingly, it is an object of the invention to provide an improved liquid crystal display device.

It is another object of the invention to improve the conductive reliability between a connect pin clip and a terminal electrode of a liquid crystal display device by chamfering at least one ridge line of the glass substrate at the terminal electrode portion.

It is a further object of the invention to provide a liquid crystal display in which there is decreased conductive resistance when the connect pin clip impinges on the terminal electrode.

Yet another object of the invention is to provide increased manufacturing yield of liquid crystal display devices by reducing the intrinsic stress on the material during the insertion of a connect pin clip upon the terminal electrode and the substrate layer.

It is still another object of the invention to provide a liquid crystal display device in which the erosion of solder plating agent on the surface of the connect pin clip as well as the deterioration of the connect pin clip material is reduced.

Yet another object of the invention is to decrease adverse effects caused by impact vibrations during the insertion of the connect pin clip upon the terminal electrode and substrate layer of a liquid crystal display device.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 6 is a graph of resistance value variation rates versus testing time for the planar chamfer and the R chamfer of FIGS. 1 and 4, respectively.

DESCRIPTION OF THE PREFERRED EMBODIMENTS

Figure 1:
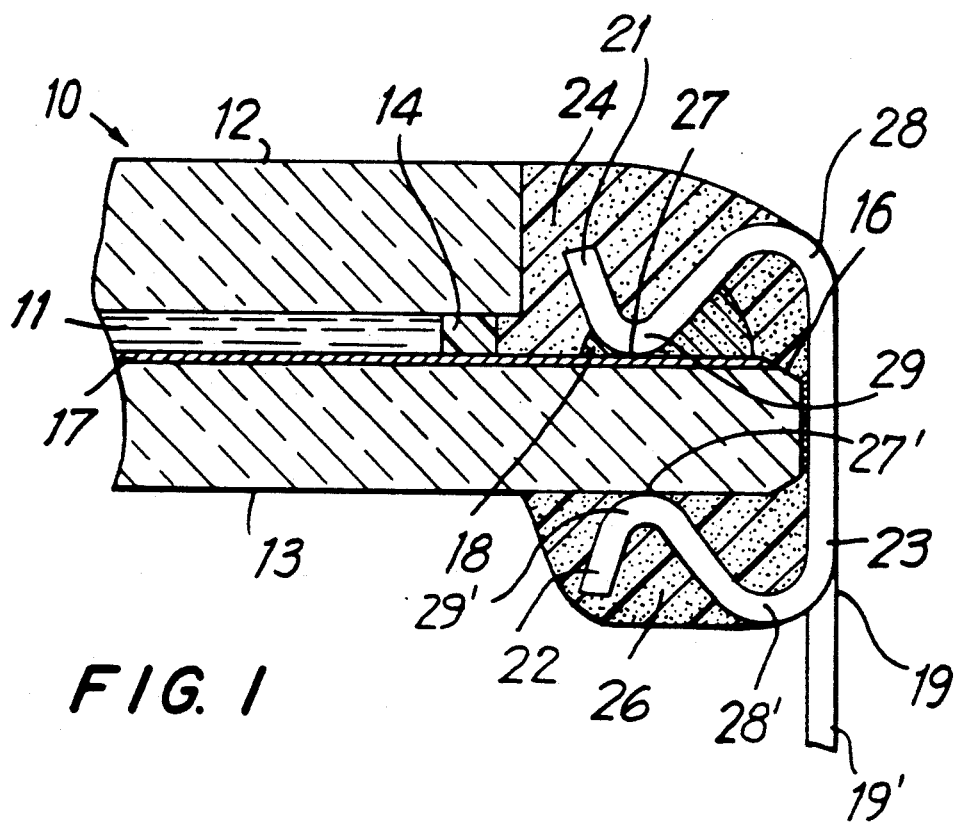
FIG. 1 is a partial cross-sectional view of a liquid crystal display device constructed in accordance with a first embodiment of the invention.

FIG. 1 illustrates an electrode terminal portion of a liquid crystal display device 10. A first glass substrate 12 and an opposed second glass substrate 13, are separated by a spacer 14 with a twisted nematic (TN) or super twisted nematic (STN) liquid crystal material 11 therebetween. Opposed transparent electrodes for forming the display are disposed on the interior surfaces of substrates 12 and 13. A terminal electrode 17 on second glass substrate 13 extends to the exposed region of substrate 13 which extends beyond substrate 12.

Figure 2:
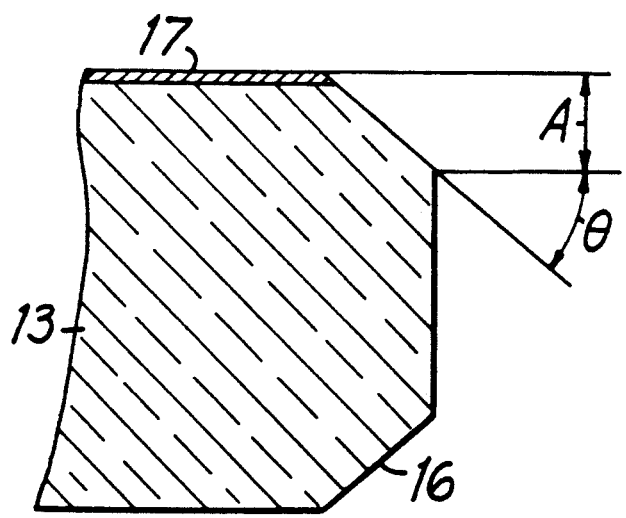
FIG. 2 is an enlarged view of the chamfer at the ridge line of the glass substrate having an electrode terminal portion in FIG. 1.

As illustrated in FIGS. 1 and 2, a planar chamfer 16 is formed along at least one of the ridge lines of second glass substrate 13 which has terminal electrode 17 thereon. Planar chamfer 16 is formed at the end of second glass substrate 13 by a diamond wheel, or the like. As illustrated in FIG. 2, planar chamfer 16 has a planar chamfer quantity A and a chamfer angle $\theta$.

A conductive resin 18 is printed or coated on terminal electrode 17. The connect pin clip 19, having a substantially "C" shape, includes an upper leg 21, a lower leg 22 and a connect pin clip base 23 as illustrated in FIG. 1. The opposing upper leg 21 and the opposing lower leg 22 are configured in a mirror image. The opposing upper leg 21 comprises two elbow-shaped sections, 28 and 29. Upper leg 21 forms a first elbow-shaped section 28 which is inverted relative to terminal electrode 17 as illustrated in FIG. 1, and then angles towards contact point 27 on terminal electrode 17. Upper leg 21 has a second elbow-shaped section 29 that contacts terminal electrode 17 of liquid crystal display device 10 in the region of conductive resin 18 at contact point 27. Upper leg 21 then extends away from contact point 27, terminating within the boundaries of molding agent 24 as further described below. The opposing lower leg 22 comprises two elbow-shaped sections, 28' and 29'. Lower leg 22 forms a first elbow-shaped section 28' which is inverted relative to substrate 13 as illustrated in FIG. 1, and then angles towards contact point 27' on substrate 13. Lower leg 22 has a second elbow-shaped section 29' that contacts substrate 13 at contact point 27'. Lower leg 22 then extends away from the contact point 27', terminating within the boundaries of molding agent 26 as further described below. connect pin clip 19 is inserted on the terminal electrode 17 by the driving force of a cylinder or the like.

A quantity of an upper molding agent 24 is provided to surround connect pin clip leg 21 and lower molding agent 26 is provided to surround connect pin clip leg 22. Molding agents 24 and 26 are applied to cover both legs of connect pin clip 19. Molding agents 24 and 26 are electrical insulators and are provided to prevent connect pin clip 19 from causing terminal electrode 17 from being short-circuited. Molding agents 24 and 26 are irradiated with ultraviolet rays and are thereby hardened by the use of ultraviolet curable resin.

When liquid crystal display device 10 is in its finished state, conductive resin 18 and connect pin clip leg 21 are fixed to terminal electrode 17. Conductive resin 18 is completely surrounded by upper molding agent 24 and is thus not exposed to the outside environment. Consequently, the conductive reliability of the connection between terminal electrode 17 and upper pin clip leg 21 is stabilized. This significantly reduces disconnections caused by a rise in the conductive resistance. Further, conduction reliability and manufacturing yield are significantly improved.

The planar chamfer prepared in accordance with the first embodiment of this invention is illustrated in greater detail in FIG. 2. When planar chamfer 16 is formed on substrate 13, as shown in FIG. 1, a decrease in variations in the resistance value occurs after connect pin clip leg 21 impinges on terminal electrode 17. Planar chamfer 16 forms a planar chamfer quantity A and a planar chamfer angle $\theta$ as shown in FIG. 2.

It is preferred that planar chamfer angle, 8, be between 20° and 60°. In the most preferred embodiment of the invention, planar chamfer angle, $\theta$, is about 45°. It is also preferable that the thickness of second glass substrate 13 be at least 0.2 mm. It has been established through experimentation, that when $\theta$ is about 45° and the substrate thickness is at least 0.2 mm, a relationship between the glass substrate thickness T is developed which determines the optimum value for planar chamfer quantity A. This relationship is represented by the following approximation formula:

$$A \simeq 0.28 \times T$$

wherein A is planar chamfer quantity (mm) and T is the glass substrate thickness (mm) and is at least 0.2 mm.

The following examples are presented to illustrate liquid crystal display devices arranged in accordance with the invention. These examples are set forth for purposes of illustration, and not intended in a limiting sense.

EXAMPLE 1

In order to determine the relationship between glass substrate thickness T and planar chamfer thickness A, experiments were conducted in which connect pin clip 19 had a thickness of 0.3 mm and was formed of phosphor bronze (PBSR-½H) and plated with a copper base of 4 microns or less and a solder surface of 3–8 microns. Glass substrate thickness, T, was 1.1 mm and planar chamfer quantity, A, was 0.3 mm. The results are illustrated in Table 1.

TABLE 1

Test Results of Correlation of Chamfer Angle versus Reliability

| No. | $\theta$ | CONNECT PIN STATE | DETERIORATION RATE | REMARKS |
|---|---|---|---|---|
| 1 | 90° | erosion of solder plating | 10% | |
| 2 | 70° | erosion of solder plating | 0.02% | |
| 3 | 60° | no abnormality | 0% | |
| 4 | 45° | no abnormality | 0% | optimum conditions |
| 5 | 20° | no abnormality | 0% | |
| 6 | 10% | no abnormality | 0.1% | abnormality of pin clip force |

As demonstrated by the results set forth in Table 1, when a planar chamfer is not formed ($\theta = 90°$), the deterioration rate is significantly higher than when substrate 13 has a planar chamfer with an angle between 20°–60° due to the erosion of the solder plating. When $\theta = 10°$, deterioration in the connection of the pin clip also occurs. Similar results occurred when other steel materials such as PBS-½H, cold rolled steel (SPCC), etc. were tested. Thus, the planar chamfer significantly increases the conductive reliability by reducing deterioration rates and abnormalities of the connect pin clip.

EXAMPLE 2

The experiments described in Example 1 were conducted with glass substrates 1.1 mm thick and a chamfer quantity of 0.3 mm. Upon further testing in which $\theta = 45°$, a correlation between the optimum chamfer quantity, A, and the glass substrate thickness, T, was developed. The optimum peak values are indicated in Table 2.

TABLE 2

Correlation of Glass Thickness versus Chamfer Quantity

| GLASS SUBSTRATE THICKNESS, T (MM) | CHAMFER QUANTITY, A (MM) |
|---|---|
| 1.1 | 0.3 |
| 1.0 | 0.28 |
| 0.7 | 0.20 |
| 0.55 | 0.15 |
| 0.4 | 0.10 |
| 0.3 | 0.08 |

Figure 3:
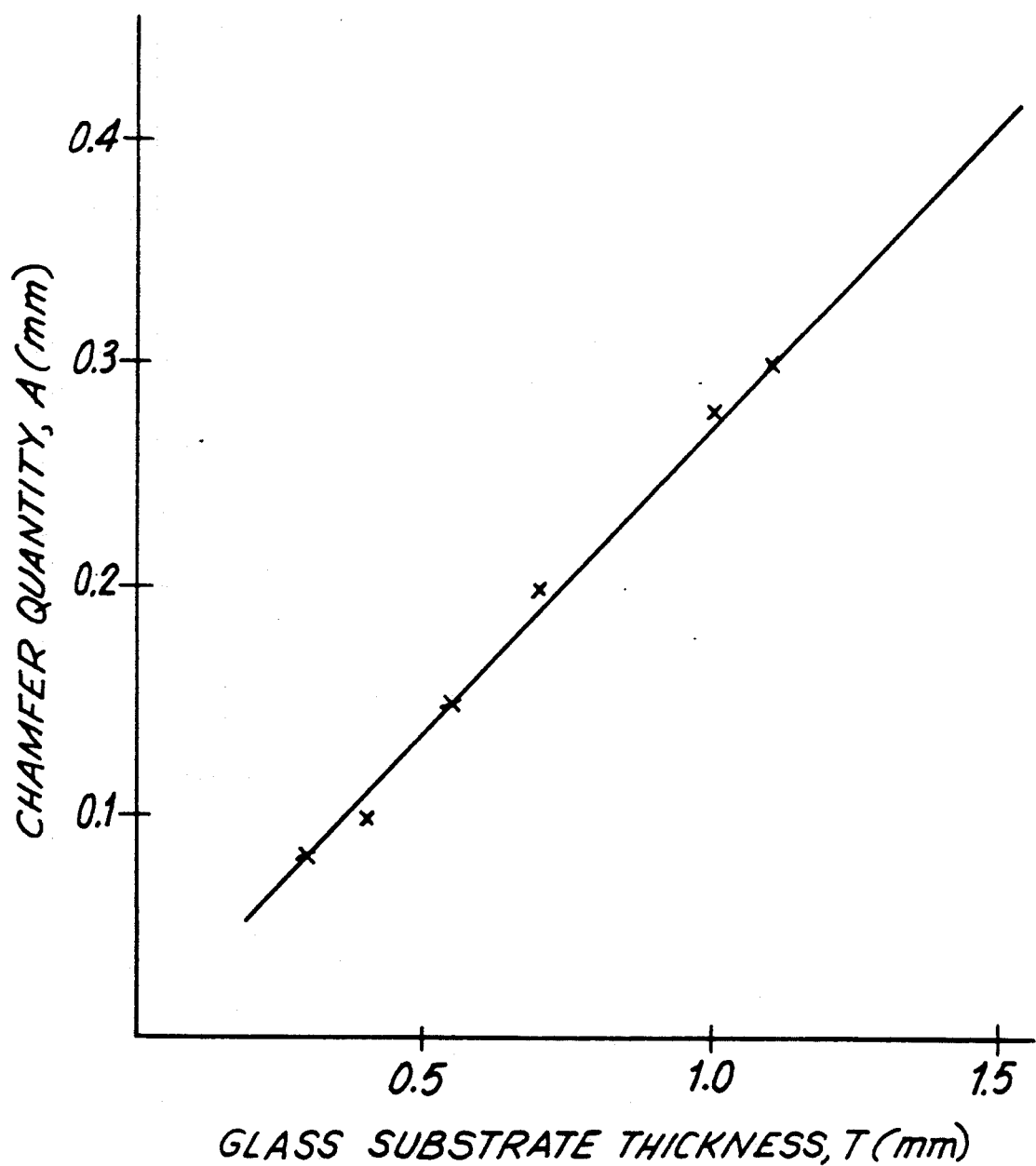
FIG. 3 is a graph of optimum chamfer quantity versus glass substrate thickness.

FIG. 3 is a graph of optimum chamfer quantity, A versus glass substrate thickness, T. FIG. 3 is based on the results of Table 2. Thus, Table 2 and FIG. 3 demonstrate the correlation of the optimum chamfer quantity when the glass substrate thickness varies. The test results provided for the development of the following approximation formula, which allows for the determination of the optimum chamfer quantity value, A when the glass substrate thickness, T is 0.2 mm or greater:

$$A = 0.28 \times T.$$

As demonstrated by the test results, and in particular as illustrated by Table 1, the invention provides dramatic improvement over the prior art by providing planar chamfer 16 formed along at least one of the ridge lines of glass substrate 13 with terminal electrode 17 thereon. Moreover, the invention provides the ability to optimize the chamfer quantity value, based on the glass substrate thickness, thereby further reducing deterioration rates over the prior art.

Figure 4:
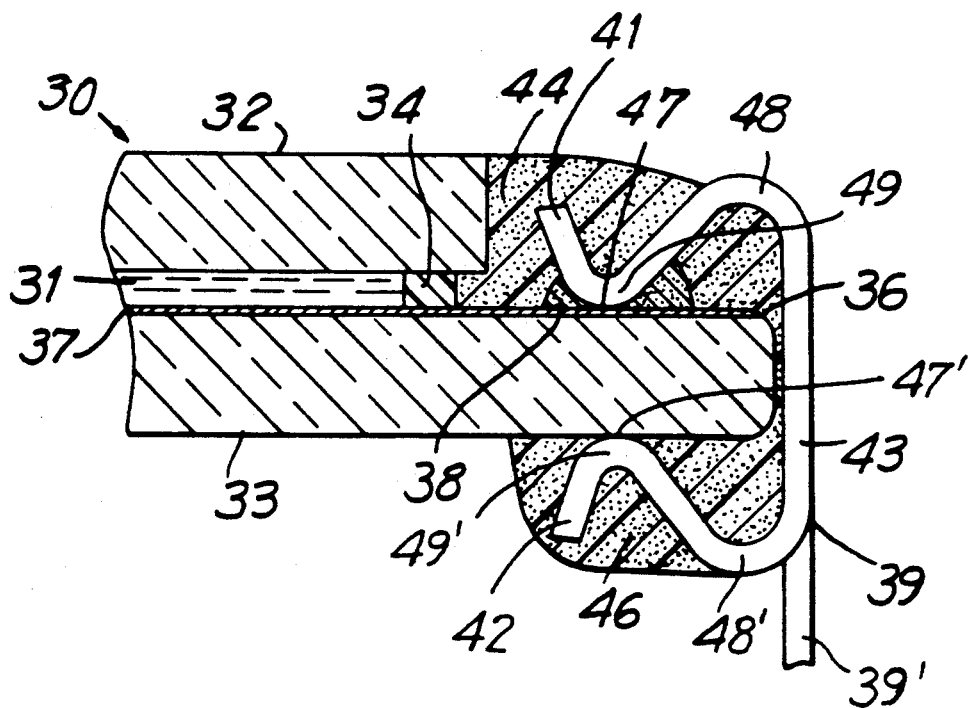
FIG. 4 is a partial cross-sectional view of a liquid crystal display device constructed in accordance with a second embodiment of the invention.

A liquid crystal display device 30 constructed and arranged in accordance with a second embodiment of the invention is shown in FIG. 4. Display device 30 is similar to display device 10, except that display device 30 includes a chamfer region 36 which differs from chamfer region 16 in display device 10. Liquid crystal display device 30 includes a first substrate 32 and a second substrate 33 with a terminal electrode 37 separated by a spacer 34. A liquid crystal material 31 is disposed between substrates 32 and 33.

Figure 5:
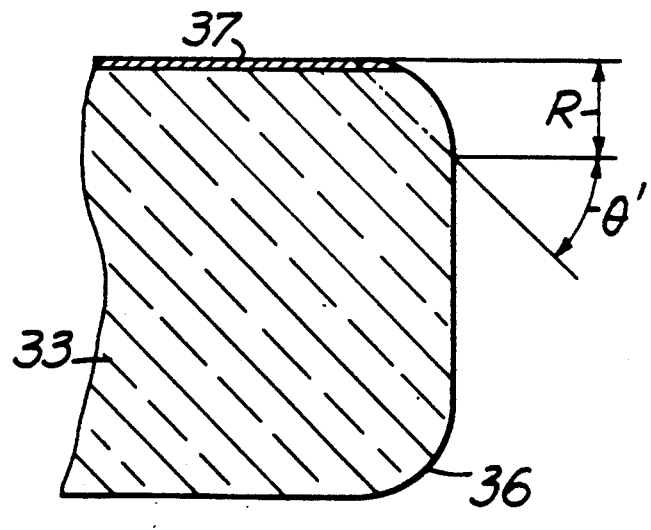
FIG. 5 is an enlarged view of the R chamfer of the substrate in FIG. 4.

As illustrated by FIGS. 4 and 5, a rounded or R chamfer 36 is formed along at least one ridge line of second glass substrate 33 having terminal electrode 37 thereon. R chamfer 36 is formed at the edge of the second glass substrate 33 by utilizing a cutting tool such as a diamond wheel, or the like. As illustrated in FIG. 5, the R chamfer 36 has a chamfer quantity R and a chamfer angle $\theta'$.

A conductive resin 38 is printed or coated on terminal electrode 37 at a contact region 47. The connect pin clip 39, having a substantially "C" shape, includes an upper leg 41 and a lower leg 42 and a connect pin clip base 43 therebetween, as illustrated in FIG. 4. The opposing upper leg 41 and the opposing lower leg 42 are configured in a mirror image. The opposing upper leg 41 comprises two elbow-shaped sections, 48 and 49. Upper leg 41 forms a first elbow-shaped section 48 which is inverted relative to the terminal electrode 37 as illustrated in FIG. 4, and then angles towards contact point 47 on electrode 37. Upper leg 41 has a second elbow-shaped section 49 that contacts terminal electrode 37 of liquid crystal display device 30 in the region of conductive resin 38 at contact point 47. Upper leg 41 then extends away from the contact point 47, terminating within the boundaries of molding agent 44 as further described below. The opposing lower leg 42 comprises two elbow-shaped sections, 48' and 49'. Lower leg 42 forms a first elbow-shaped section 48' which is inverted relative to substrate 33 as illustrated in FIG. 4, and then angles towards contact point 47' on substrate 33. Lower leg 42 has a second elbow-shaped section 49' that contacts substrate 33 at contact point 47'. Lower leg 42 then extends away from the contact point 47', terminating within the boundaries of molding agent 46 as further described below. Clip 39 is inserted by the driving force of a cylinder or the like.

An upper molding agent 44 surrounds upper connect pin clip leg 41 and a lower molding agent 46 surrounds lower connect pin clip leg 42 and are irradiated with ultraviolet rays and are hardened by the use of ultraviolet curable resin. Molding agents 44 and 46 are applied to cover the connect pin clip 39. Molding agents 44 and 46 are electrical insulators and are provided to prevent connect pin clip 39 from causing terminal electrode 37 from being short-circuited.

When the liquid crystal display device 30 is in its finished state, conductive resin 38 and connect pin clip leg 41 are fixed to terminal electrode 37. Conductive resin 38 is completely surrounded by upper molding agent 44 and is not exposed to the outside environment. Consequently, the conductive reliability of the connection between terminal electrode 37 and upper pin clip leg 41 is stabilized. This significantly reduces disconnections caused by a rise in the conductive resistance. Further, conduction reliability and manufacturing yield are significantly improved.

The details of the R chamfer prepared in accordance with the second embodiment of the invention are illustrated in FIG. 5. When R chamfer 36 is provided on terminal electrode 37, a decrease in variations in the resistance value occurs after connect pin clip leg 41 impinges upon terminal electrode 37. R chamfer 36 has an R chamfer quantity R and an R chamfer angle $\theta'$ as shown in FIG. 5. It is preferable that chamfer angle R be between about 20° and 60°, and most preferably be about 45°. It is also preferred that glass substrate thickness T be at least 0.2 mm.

It has been determined that when the substrate thickness is at least 0.2 mm and R chamfer angle is 45°, a relationship between the glass substrate thickness T is developed. As in the first embodiment of the invention, this relationship is represented by the following formula:

$$R = 0.28 \times T$$

wherein R is the R chamfer quantity (mm) and T is the glass substrate thickness T (mm) and is at least 0.2 mm.

EXAMPLE 3

Tests similar to those performed with respect to the planar chamfer as reported in Examples 1 and 2 were conducted using the R chamfer. Several advantages resulted based on the structure of the R chamfer, including improvements when contact portion 47 of connect pin clip 39 impinges on terminal electrode 37 as well as improvements in the surface accuracy or reliability of the contact portion 47 of the upper connect pin clip leg 41 and terminal electrode 37.

The graph of FIG. 6 illustrates the rate of change of resistance value versus the testing time. The graph includes the data points representing the performance of the invention in accordance with the first embodiment of the invention as disclosed in FIGS. 1 and 2, which is represented by the data points plotted with the broken line 60. The graph also includes a plot of data points representing the performance of the present invention in accordance with the second embodiment of the present invention as disclosed in FIGS. 4 and 5, which is represented by the data points plotted with the solid line 61.

The tests were conducted under conditions of high temperature and high humidity, which is known in the art to be the severest test for liquid crystal display devices. Specifically, the test conditions included a temperature of 60° C. and a relative humidity of 90% RH. The results in FIG. 6 show that less variation in resistance value occurs when the chamfer is formed of an R chamfer compared to a planar chamfer. The results in FIG. 6 also show that the stability for an R chamfer can be held at ⅓ the variation rate for a planar chamfer after 1600 hours. However, the results in Table 1 demonstrate that the use of a planar chamfer significantly improves the conductive reliability and the manufacturing yield over the prior art.

In Examples 1 and 2, the optimum chamfer quantity, R, is 0.3 mm when the glass substrate thickness, T, is 1.1 mm. Furthermore, the glass substrate thickness T and the optimum chamfer quantity R have a correlation as demonstrated in FIG. 3 and as represented by the above approximation formula.

It can be seen from the graph of FIG. 6 that forming a chamfer along at least one of the ridge lines of a glass substrate having a terminal electrode disposed thereon solves many of the problems of the prior art. When a chamfer is included, the variation in conductive reliability is significantly reduced, while the manufacturing yield is significantly increased. As demonstrated by Table 1 and FIG. 6, these results can be further improved by including an R chamfer as opposed to a planar chamfer. Moreover, utilizing a chamfer with a chamfer angle of 45° and a chamfer quantity which follows the optimum chamfer value approximation formula discussed above, these improvements are further increased. The chamfer improves contact between the connect pin clip leg and the terminal electrode with more stabilization which will thereby be less likely to deteriorate during heat, humidity or vibration. Accordingly, the invention vastly improves upon the prior art by including the use of a chamfer on the substrate layer having the terminal electrode disposed thereon.

It will thus be seen that the objects set forth above, among those made apparent from the preceding description, are efficiently attained, and since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which as a matter of language, might be said to fall therebetween.

I claim:

1. A liquid crystal display device comprising:
   a pair of opposed substrates with one of the substrates extending beyond the other to define a substrate terminal electrode region with an upper edge corner and a lower edge corner, and an electrode extending to the terminal electrode region;
   a connect pin clip having a substantially "C" shape, said connect pin clip having first and second opposing legs for engaging the substrate and electrode at the edge of the terminal electrode regions of the substrate;
   said first opposing leg comprising two substantially elbow-shaped sections, whereby said first substantially elbow-shaped section of said first opposing leg extends towards said terminal electrode region to contact said electrode and said second substantially elbow-shaped section of said first opposing leg then extending away from said electrode;
   said second opposing leg comprising two substantially elbow-shaped sections, whereby said first substantially elbow-shaped section of said second opposing leg extends towards the opposing surface of said substrate and contacts said substrate at a position substantially opposed to said first opposing leg and said second substantially elbow-shaped section of said second opposing leg then extending away from said substrate; and
   a chamfer formed on at least one edge corner of the substrate terminal electrode region, wherein the chamfer has a chamfer quantity A, represented by the following formula:

$$A \approx 0.28 \times T$$

wherein A is the depth of the chamfer measured perpendicular to the surface of the substrate having the terminal electrode thereon, and T represents the substrate thickness and is at least 0.2 mm.

2. The liquid crystal display device of claim 1, further including a conductive resin coupling the one leg of said clip contacting the electrode and the substrate.

3. The liquid crystal display device of claim 1, further including a cured molding agent coated over the first and second legs of said clip.

4. The liquid crystal display device of claim 1, wherein said electrode substrate is formed of glass.

5. The liquid crystal display device of claim 4, wherein both edges of said substrate are chamfered.

6. The liquid crystal display device of claim 1, wherein the chamfer is a planar chamfer.

7. The liquid crystal display device of claim 6, wherein said planar chamfer has a planar chamfer angle between about 20° and 60°.

8. The liquid crystal display device of claim 6, wherein said planar chamfer has a planar chamfer angle of about 45°.

9. The liquid crystal display device of claim 1, wherein the chamfer is an R chamfer.

10. The liquid crystal display device of claim 9, wherein said chamfer is an R chamfer having an R chamfer angle between 20° and 60°.

11. The liquid crystal display device of claim 9, wherein said R chamfer is an R chamfer having an R chamfer angle of about 45°.

12. A liquid crystal display device comprising:
    a pair of opposed glass substrates, one of the substrates extending beyond the other to form a terminal electrode region at an edge, the edge having an upper and a lower corner, and a terminal electrode disposed on the terminal electrode region;

a chamfer formed on the upper and lower corners of said substrate, wherein the chamfer has a chamfer quantity A, represented by the following formula:

$$A \simeq 0.28 \times T$$

wherein A is the depth of the chamfer measured perpendicular to the surface of the substrate having the terminal electrode thereon, and T represents the substrate thickness and is at least 0.2 mm.;

a connect pin clip having a substantially "C" shape, said connect pin clip having first and second opposing legs biased towards each other for engaging the substrate and terminal electrode at the edge of the terminal electrode region of said substrate;

said first opposing leg comprising two substantially elbow-shaped sections, whereby said first substantially elbow-shaped section of said first opposing leg extends towards said terminal electrode region to contact said electrode and said second substantially elbow-shaped section of said first opposing leg then extending away from said electrode;

said second opposing leg comprising two substantially elbow-shaped sections, whereby said first substantially elbow-shaped section of said second opposing leg extends towards the opposed surface of said substrate and contacts said substrate at a position substantially opposed to said first opposing leg and said second substantially elbow-shaped section of said second opposing leg then extending away from said substrate; and a conductive resin coupling the upper leg of said clip and the terminal electrode.

13. The liquid crystal display device of claim 12, wherein at least one of the chamfers is a planar chamfer.

14. The liquid crystal display device of claim 13, wherein said chamfers are planar chamfers having a planar chamfer angle of about 45°, a substrate thickness of 1.1 mm and a planar chamfer quantity of 0.3 mm.

15. The liquid crystal display device of claim 12, wherein at least one of the chamfers is an R chamfer.

16. The liquid crystal display device of claim 15, wherein said chamfers are R chamfers having an R chamfer angle of about 45°, a substrate thickness of 1.1 mm and an R chamfer quantity of 0.3 mm.

* * * * *